3,371,072
SULPHUR RESINS
Jean-Baptiste Signouret, Billere, and Jean Barge, Pau, France, assignors to Societe Nationale des Petroles d'Aquitaine, Paris, France
No Drawing. Filed Mar. 21, 1966, Ser. No. 536,145
Claims priority, application France, Mar. 23, 1965, 10,265, 10,266
11 Claims. (Cl. 260—79)

ABSTRACT OF THE DISCLOSURE

This invention relates to a process for manufacturing sulphur resins and, more particularly, to such a process in which a polythiomethylene-alkanol resin is heated with an ethylenic compound.

Certain known resins, obtained by simultaneous action of a haloepoxy alkane and hydrogen sulphide on an aqueous solution of a polysulphide of alkali or alkaline earth metal have the property of being soluble in molten sulphur; they exert a plasticizing action on the sulfur and this leads to the obtaining of highly interesting plastic compositions. These materials can be obtained in a more or less hard form and they are capable of forming coatings, particularly for concrete, brickwork, asphalted surfaces, or other similar materials. The aforementioned uses can be further extended or diversified by modifying these sulfur resins in accordance with the present invention. It is, in fact, possible to improve their insulation, bonding, tightness, and adhesion qualities with respect to different materials by the application of the present invention. The new resins may serve as a binder for different constructional materials, such as bricks; they can serve for the assembly of various construction elements; they can also be used as adjuvant or binder for mortar, asphalt, or any other similar material.

It is, therefore, an outstanding object of the invention to provide a process for producing a novel resin by the treatment of polythiomethylene alkanol resins with ethylenic compounds.

Another object of the invention is the provision of a resin formed by the interaction of polythiomethylene alkanols with ethylenic compounds.

A further object of the present invention is the provision of a process for plasticizing sulfur by the addition of polythiomethylene alkanols and ethylenic compounds.

With the foregoing and other objects in view which will appear as the description proceeds, the invention resides in the combination and arrangement of steps and in the details of operation hereinafter described and claimed, it being understood that changes in the precise embodiment of the invention herein disclosed may be made within the scope of what is claimed without departing from the spirit of the invention.

The new sulfur resins, in accordance with the invention, are resins of the polythiomethylene alkanol type which are modified by heating with one or more ethylenic compounds. According to one particularly advantageous form of the invention, the modification by heating with an ethylenic compound applies not only to the polythiomethylene alkanol resin alone, but to a plastic composition formed by heating such a resin with a fairly large proportion of molten sulfur.

In the present specification, the term polythiomethylene alkanol is used to designate the resins prepared by the action of a haloepoxy alkane on an alkali or alkaline earth polysulphide in the presence of hydrogen sulphide. This term is used rather to facilitate the expression, although the composition of the resins in question is still not perfectly clear and their general formula:

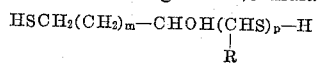

is only hypothetical. For the sake of simplification of the language, these resins will hereinafter be designated in the present specification by the abbreviation Rs.

In order to carry out the modification of the aforementioned resin and of the plastic compositions obtained by its addition to sulfur, it is possible to employ different ethylenic compounds, as for example: olefinic aliphatic hydrocarbons, particularly isobutene, diisobutene, triisobutene, etc; cycloalkenes, such as cyclopentene, cyclohexene, etc; terpenes, such as pinene, camphene, allocimene, myrcene; aralkenes, such as styrene, α-methylstyrene, chlorostyrene, indene; dienes, such as allene, butadiene, isoprene, chloroprene, 1,5 hexadiene (diallyl), dimethallyl, 1,6 heptadiene cyclopentadiene, other unsaturated hydrocarbons, as for example vinylcyclopentadiene, vinylcyclohexene; divinylacetylene, divinylbenzene, trivinylbenzene, hexatriene, etc. In addition to unsaturated hydrocarbons, of which some examples have just been mentioned, it is also possible beneficially to employ olefinic compounds having other functions, as for example: acrylates, methacrylates, vinyl esters, such as acetates, formates, butyrates; vinyl halides, and particularly vinyl chloride, acrylonitrile, methyl vinyl ketone, oleic acid, undecyclenic acid, acrolein, methyl ether, vinyl ether and, in general, other olefinic compounds. From a practical point of view, the ethylenic compounds which are preferred for modifying the resin in question are primarily styrene and its direct derivatives, as for example α-methylstyrene and the olefines having 4 to 12 carbon atoms, particularly isobutene, diisobutene and triisobutene. It is obvious that the modification, in accordance with the invention, can be obtained by the concurrent use for several olefinic compounds.

The general working method for obtaining the modificaiton according to the invention consists in heating one part by weight of resin to be modified with 0.01 to 100 and, preferably, 0.1 to 10 parts by weight of one or more of the olefinic compounds which have been set forth above. The resin, as already specified, is a resin of the polythiomethylene alkanol type by itself or the plastic composition obtained by heating such a resin with molten sulfur. When the modifying ethylenic compound is heated with the resin Rs alone, its proportion is generally of the order of 0.5 to 5 parts by weight to 1 part of the said resin. In the case where the modifying agent is added to a plastic composition composed of sulfur plasticized with the resin Rs, the proportion of ethylenic compounds to 1 part of the total Rs+S is usually of the order of 0.1 to 1 part by weight. It is understood that the composition of sulfur plasticized with the resin Rs may have been prepared in advance or even at the actual instant of adding the modifying agent; in the latter case, the working method consists in adding the resins Rs and the ethylenic compound at the same time or separately to a certain quantity of molten sulfur, and continuing the heating for the time required to obtain a homogeneous mass.

The invention is of particular interest for the preparation of modified sulfur resins which are soluble in molten sulfur. The following working conditions permit such products to be obtained. The heating may take place at temperatures which are between approximately 100° C. and 200° C. (preferably between 110° C. and 160° C.), and the heating may take place on the materials as such or on their solution in an appropriate solvent. Depending on the vapor tension of the ethylenic compound which is used and/or of the solvent and on the temperature, the operation may be carried out at atmospheric pressure or under more or less high pressures, for example up to 200 kg./cm.$^2$. The heating period is a function of the other working conditions, the nature of the compounds being used and the qualities desired for the modified resin, and generally varies between 30 minutes and several hours, for example 10 hours. It is possible to catalyze the reaction by adding substances such as Friedel-Crafts catalysts or Lewis acids, for example, boron fluoride. Derivatives supplying free radicals, such as azo-bis-isobutyronitrile, also exert an accelerating action on the reaction between the ethylenic compounds and the sulfur resin in question.

During the operations set out in the present specification, the standard test adopted as criterion of the solubility in sulfur of the resin modified according to the invention is carried out as follows: 15 g. of modified resin, or of sulfur plasticized with this resin, are mixed with 85 g. of sulfur and heated at 150° C. for 1 hour, while stirring; if the product is completely dissolved without any residue and without causing any setting or precipitation in the solution, and if after casting the film formed after cooling is homogeneous, it is considered that the resin is soluble in sulfur.

The present invention permits one to obtain a very great improvement in the adhesiveness of the resin with different materials, particularly concrete. The preferred embodiment which makes this improvement possible consists in using a plastic sulfur mass which is obtained by heating at least 60 parts by weight of molten sulfur (and particularly 60 to 95 parts) with not more than 40 parts of resin Rs and of modifying ethylenic compound, that is to say, 40 to 5 parts, taken together. Remarkable results are obtained when the proportion of sulfur in this composition is from 80 to 90%, to 20 to 10% of total resin Rs and modifying ethylenic agent.

In the particular case where styrene is used as modifying agent for the manufacture of a plastic composition for marking asphalted or concrete roads, the preferred method of preparation consists in causing the resin Rs to react with the sulfur at about 145° C., mixing taking place for 1 hour; coloring agents and/or pigments are added, if required. The molten mass is then allowed to cool to about 110°–115° C. in order to add thereto the styrene with which the mass is further heated for 1 hour at 110° to 115° C. The product obtained is poured and ground, possibly with incorporation of a non-lumping agent. There is thus obtained a powder which it is possible to melt and apply to the asphalt at about 140° C. by means of a special machine comprising an atomizing pistol. The material prepared in this way adheres equally very well to metals, glass, bricks and concrete.

The examples which follow are intended to illustrate the invention in a non-limiting manner. The first of these examples refers to the preparation of the resin Rs described in French Patent No. 1,425,283 of July 23, 1964; it is to be well understood that the present invention is not limited to the particular resin obtained according to this Example 1.

*Example 1.—Preparation of a polythiomethylene-alkanol resin (resin Rs)*

Using a suitable reactor, 8.4 kg. of 48% by weight sodium hydroxide solution and 1.6 kg. of powdered sulfur are added to 8 kg. of water; the mixture is stirred while injecting gaseous hydrogen sulphide. When the quantity of H$_2$S introduced is 1.7 kg., the polysulphide which is formed has the mean composition S$_2$Na$_2$; 9 kg. of epichlorhydrin are then added while stirring at 85°±5° C., while continuing to inject hydrogen sulphide in excess. After completing the injection of epichlorhydrin, the mixture is stirred for one hour at 85° C., without introduction of hydrogen sulphide. Of the approximately 4 kg. of hydrogen sulphide which is used, 3.4 kg. thereof is combined with the reaction medium. After decantation at about 75° C., washing is carried out three times with 8 kg. of cold water and dehydration takes place at 110° C. while stirring, this giving about 10 kg. of soft resin; this resin is liquid at about 80° C.; it is soluble in tetrahydrofuran, dioxane, dimethyl formamide, dimethyl sulphoxide and in molten sulfur; this latter is plasticized when it contains the resin in question. The analysis of the resin shows: S=50%, SH=12%.

This resin is called Rs in the present specification.

*Example 2.—To obtain a solid product*

1 kg. of resin Rs, prepared according to Example 1, is added to 8 kg. of sulfur at 145° C. After 1 hour, the solution thus obtained is cooled and 1 kg. of styrene is added thereto, after which the complete mixture is kept for 1 hour at 110° C. A plastic composition is obtained, which hardens slowly. The composition is soluble in sulfur. In this preparation, there have been used 80 parts by weight of sulfur, 10 parts by weight of resin and 10 parts by weight of styrene.

*Example 3.—To obtain a soft resin*

In the present preparation, 50 parts by weight of sulfur have associated therewith 25 parts of resin and 25 parts of styrene, by causing this latter to react at 145° C. instead of 110° C., as in the previous example. The details of the operation are as follows: 5 kg. of molten sulfur and 2.5 kg. of resin Rs are heated together at 145° C. for one hour while stirring. 2.5 kg. of styrene are then added and heating is continued at 145° C. while stirring and with reflux for 3 hours. When all signs of reflux have ceased, the composition is poured, this being in the form of a soft resin which is soluble in sulfur.

*Example 4.—To obtain a liquid resin*

This example is characterized by the use of a larger proportion of styrene and a more prolonged heating at 145° C. This reaction mixture comprises 20 parts by weight of sulfur, 20 parts by weight of Rs and 60 parts by weight of styrene.

In particular, 2 kg. of sulfur are mixed with 2 kg. of resin Rs and 6 kg. of styrene in a reactor and the combination is heated for 10 hours at 145° C. The homogeneous, viscous liquid which is obtained is soluble in sulfur.

*Example 5.—To obtain a soft resin with the use of triisobutene*

In this case, the reaction mixture comprises 50 parts by weight of sulfur, 25 parts of triisobutene and 25 parts of resin Rs. For this purpose, a mixture of 5 kg. of sulfur, 2.5 kg. of triisobutene and 2.5 kg. of resin Rs is heated at about 140° C. for 6 hours. The soft resin obtained is soluble in sulfur.

*Example 6*

1 kg. of resin Rs prepared according to Example 1 and 1 kg. of styrene are introduced into a suitable reactor. Stirring is carried out while heating to 80° C.; the heating is stopped and 20 g. of azo-bis-isobutyronitrile are slowly added. The temperature then rises to 120° C., while the mixture becomes thickened; it is kept at 120° C. for 1 hour. After cooling, a resin more fluid than the initial resin is obtained. The sulfur, to which 15% of this resin are added, is plasticized at about 145° C.; it is adherent to concrete.

*Example 7*

90 kg. of liquid sulfur are mixed with 5 kg. of resin Rs at 145° C. while stirring and for 1 hour; after cooling to 110° C., 5 kg. of styrene are added, stirring taking place for 1 hour. A perfectly homogeneous solution is obtained, and this solution serves for the casting of road-marking strips, particularly on concrete. The strips adhere very well to concrete and to bitumen. The strips are still usable after 1 year, without any flaking.

Example 8

84 kg. of liquid sulfur are mixed at 145° C. with 8 kg. of resin Rs; after stirring for 1 hour, 1.75 kg. of yellow mineral pigment and 0.05 kg. of "Orazol yellow" organic dye are added; the mixture is left for 1 hour at 145° C., while stirring, after which it is cooled to 115° C.; 8 kg. of styrene are then slowly added while stirring well. The composition is then left for 1 hour at 110° C. and then it is poured. The thermoplastic composition which is obtained, remelted and poured with the use of a special machine, provided with a heated atomizing pistol, is employed for providing road-marking strips directly on bituminous surfaces and on concrete. On a surface formed by this latter material, there is observed an exceptional adhesion after hardening and an excellent resistance to wear caused by pneumatic tires. The same also applies as regards strips applied to a bituminous surface, these strips remaining serviceable after one year, without any flaking. There is also observed an excellent resistance to natural elements, such as rain and sun.

Example 9

A thermoplastic composition is prepared which is identical with that of Example 8; when used as marking strips, blue-tinted glass balls are incorporated into the liquid composition, these being especially for a road surface. 5 kg. of said balls are used to 100 kg. of product; 2 kg. of glass balls are also spread on the surface, per 100 kg. of product. The strip thus obtained has a decidedly improved reflecting power and the coefficient of friction is also improved.

Example 10

A thermoplastic composition is prepared which is identical with that of Example 8; when it is used as marking strips, 3 kg. of polystyrene balls, originating from the well-known suspension polymerization, are incorporated in 100 kg. of product. On spreading, 2 kg. of polystyrene balls are evenly distributed on the surface. The strips show a very marked improvement in the reflecting power and in the coefficient of friction.

Example 11

85 kg. of liquid sulfur are mixed with 10 kg. of resin Rs for 1 hour at 145° C., while stirring; the mixture is cooled to about 110° C. for adding 5 kg. of styrene thereto; after this, the composition is kept at 110° C. and stirred for 1 hour. It is then poured.

After cooling, the thermoplastic composition which is obtained is re-melted and applied to a concrete wall, thereby producing a protective coating which is resistant to weather influences and also to sulfurous gases.

In a similar preparation, glass fibers are incorporated into the composition, these substantially improving the shock resistance of the composition.

Asbestos fibers are incorporated into another portion of the initial composition for improvement the shock resistance.

Example 12

The preparation is similar to that of Example 11, but 7% by weight of nylon yarn waste are incorporated into the remelted composition. The composition obtained has a better shock resistance, while retaining a certain flexibility which is not possessed by the compositions filled with glass fibers or asbestos fibers.

While it will be apparent that the illustrated embodiments of the invention herein disclosed are well calculated adequately to fulfill the objects and advantages primarily stated, it is to be understood that the invention is susceptible to variation, modification, and change within the spirit and scope of the subjoined claims.

The invention having been thus described, what is claimed as new and desired to secure by Letters Patent is:

1. A process for the manufacture of an improved sulfur resin, characterized by the fact that a polythiomethylenealkanol resin is heated at a temperature in the range from 100° to 200° C. with an ethylenic compound, the resin originating from the simultaneous reaction of hydrogen sulphide and an aqueous solution of a substance selected from the class consisting of an alkali an an alkaline earth polysulphide with epichlorohydrin at a temperature in the range from 50° to 100° C.

2. A process in accordance with claim 1, wherein the said ethylenic compound is an olefinic aliphatic hydrocarbon.

3. A process in accordance with claim 2, wherein the hydrocarbon is isobutene, diisobutene or triisobutene.

4. A process in accordance with claim 1, wherein the said ethylenic compound is an aliphatic vinyl or acrylic vinyl compound.

5. A process in accordance with claim 4, wherein the said compound is styrene.

6. A process in accordance with claim 1, wherein the said ethylenic compound is selected from the class consisting of cycloalkenes, terpenes, dienes and acrylic compounds.

7. A process in acordance with claim 1, wherein the heating takes place for a period in the range from 30 minutes to 10 hours.

8. A process in accordance with claim 1, wherein the weight of ethylenic compound is in the range from 0.1 to 10 times the weight of the polythiomethylene-alkanol resin.

9. A process in accordance with claim 1, wherein the ethylenic compound and the resin are heated in admixture with molten sulfur.

10. A process in accordance with claim 9, wherein the quantity of sulfur is in the range from 60 to 95% of the weight of the mixture.

11. A resin produced by the process according to claim 1.

References Cited

UNITED STATES PATENTS

| 2,731,437 | 1/1956 | Bender et al. | 260—79.1 |
| 3,282,901 | 11/1966 | Warner et al. | 260—79.1 |

FOREIGN PATENTS

| 1,425,283 | 12/1965 | France. |

DONALD E. CZAJA, *Primary Examiner.*

M. I. MARQUIS, *Assistant Examiner.*